Oct. 23, 1956     W. L. BADGER     2,767,972
MANUFACTURE OF PLASTER OF PARIS
Filed July 12, 1952     4 Sheets-Sheet 1

INVENTOR.
WALTER L. BADGER
BY
ATTORNEY

Oct. 23, 1956  W. L. BADGER  2,767,972
MANUFACTURE OF PLASTER OF PARIS
Filed July 12, 1952  4 Sheets-Sheet 2

INVENTOR.
WALTER L. BADGER
BY
ATTORNEY

Oct. 23, 1956 W. L. BADGER 2,767,972
MANUFACTURE OF PLASTER OF PARIS
Filed July 12, 1952 4 Sheets-Sheet 3

INVENTOR.
WALTER L. BADGER
BY
ATTORNEY

Oct. 23, 1956 W. L. BADGER 2,767,972
MANUFACTURE OF PLASTER OF PARIS
Filed July 12, 1952 4 Sheets-Sheet 4

INVENTOR.
WALTER L. BADGER
BY
ATTORNEY

United States Patent Office 2,767,972
Patented Oct. 23, 1956

2,767,972

MANUFACTURE OF PLASTER OF PARIS

Walter L. Badger, Ann Arbor, Mich.

Application July 12, 1952, Serial No. 298,539

4 Claims. (Cl. 263—53)

My invention has reference to an improved method of calcining gypsum.

Plaster of Paris (calcium sulphate hemi-hydrate) is usually prepared by grinding gypsum (calcium sulphate dihydrate) to a suitable degree of fineness and subjecting it for a limited period of time to a temperature on the order of 350° F., thus driving off 75% of the water of crystallization. If the temperature to which the ground gypsum is subjected is increased, or the time of heating prolonged, the remaining water of crystallization may be eliminated, forming a material known as soluble anhydrite, which upon further heating forms a closely related material known as insoluble anhydrite. Both soluble and insoluble anhydrite are objectionable in plaster of Paris since they will set either very slowly or not at all and are therefore usually inert for practical purposes. Conversely, failure to adequately heat each particle of the ground gypsum sufficiently results in a plaster of Paris composition containing particles of calcium sulphate dihydrate. This material is a strong set accelerator for plaster of Paris and if present in appreciable quantities will quicken the set to such an extent as to make the plaster composition virtually unusable. It is therefore apparent that a satisfactory plaster should contain a minimum of soluble and insoluble anhydrite particles and only a limited quantity of uncalcined gypsum particles, this condition being preferably obtained by uniform, controlled calcination of the ground gypsum.

There are two forms of apparatus generally utilized in calcining gypsum, the most widely utilized being a kettle of cylindrical cross section having a diameter and height of several feet. Gypsum ground to approximately 60% through a standard 100 mesh screen is placed in the kettle and stirred during heating by a large agitator. In the vast majority of cases the kettle is direct fired, i. e., the hot combustion gases are brought into direct contact with the shell of the kettle. The other general form of calcining apparatus is an inclined rotating tubular kiln in which the hot combustion gases flow upwardly against a downwardly moving stream of gypsum. The exact temperature to which the gypsum particles are heated cannot be easily and accurately controlled in either form of apparatus, although kettle calcined gypsum is usually considered superior to the plaster obtained from a rotary calciner. The time required for calcining gypsum in a kettle, however, is substantial, as are the maintenance and direct operating costs, such as fuel and power.

One of the primary objects of my invention is the provision of a method of calcining gypsum which insures the uniform heating of each gypsum particle to a closely controlled automatically limited temperature for a predetermined period of time.

Another important object of my invention is the provision of a method capable of being practiced by relatively inexpensive and efficient apparatus for uniformly, automatically and continuously calcining gypsum with a minimum of heat and power, thereby substantially improving the quality and uniformity of the product and reducing the cost of manufacture.

Other objects of my invention will be disclosed in the following description and in the appended drawings, in which.

In brief, my invention contemplates grinding gypsum to such degree of fineness that it will readily flow across a suitably positioned surface in a shallow film or stream. This surface is uniformly heated to a predetermined controlled temperature by saturated vapors which are condensed in a jacket attached to the surface. By employing a suitable liquid for vaporization, I avoid the use of pressures appreciably in excess of one atmosphere, thereby permitting the use of light, relatively inexpensive calcining apparatus and avoiding the hazard necessarily involved in the use of high pressure heating vapors. Means are also provided for controlling the rate at which the ground gypsum is passed across the heating or calcining surface.

Since the surface is uniformly heated to a predetermined temperature, the gypsum particles cannot exceed such temperature and will not be retained in a heated condition for an excessive period due to the flow control means employed. As a result, virtually every individual particle will be uniformly heated to a predetermined temperature for a limited period, thereby insuring substantially perfect calcination. The time required for this operation is greatly reduced when compared with more conventional forms of calcination because the heat is not required to penetrate an appreciable distance into the powdered material in order to insure proper calcination. As a result, the rate of calcination is high and the process is continuous in nature. The proper use of saturated vapor insures not only uniform heating of the calcining surface, but also a very high coefficient of heat transfer between the vapor and calcining surface, this coefficient being at times on the order of 100 times greater than obtainable by heating the calcining surface with a gas.

Figure 1:
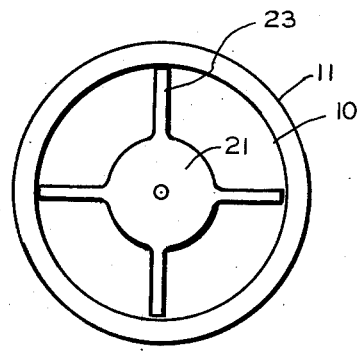
Fig. 1 is a diagrammatic cross section of apparatus illustrated in Fig. 2.
Figure 2:
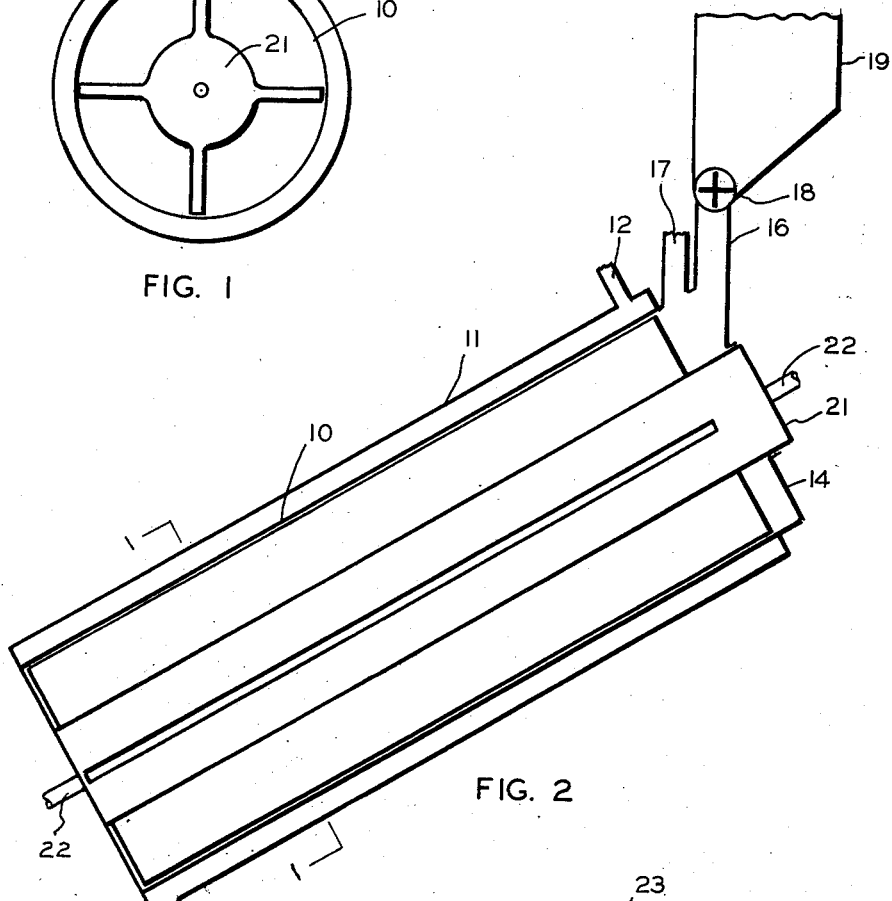
Fig. 2 is a diagrammatic cross section of apparatus incorporated in my invention.
Figure 3:
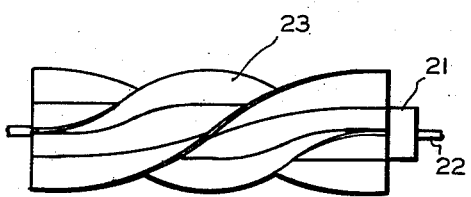
Fig. 3 is a partial elevation of a modified form of rotatable member for use in connection with the device illustrated in Fig. 2.

For a more detailed explanation of my invention, reference is made to Figs. 1–3 incl., wherein I have illustrated diagrammatically suitable continuous calcining apparatus embodying my invention.

In this apparatus I employ an external hollow cylinder 10 having an external heating vapor jacket 11 defining a vapor inlet 12 and a condensate outlet 13. The cylinder 10 is preferably stationary and disposed at an angle in excess of the angle of repose of ground gypsum, the upper and being enclosed by a hood 14 having an upwardly extending neck 16 and a vapor outlet 17. The neck 16 communicates directly with a rotary feeder 18 disposed in the lower portion of a hopper 19.

A hollow inner cylinder member 21 is arranged coaxially within the cylinder 10 and is suitably supported by trunnions 22 for rotation. The cylinder member 21 extends through the hood 14 and is provided with a plurality of radially extending vanes 23 projecting outwardly into close proximity with the inner surface of the cylinder 10. If desired, both the trunnions 22 and vanes 23 may be hollow, thus permitting the addition of heating vapor through the upper trunnion 22 and the discharge of condensate through the lower trunnion.

The vanes 23 may be straight, as indicated in Figs. 1 and 2, or arranged in a spiral, as indicated in Fig. 3, the latter arrangement being preferable where close control over the rate or gypsum movement is essential and the cylinder 10 cannot be disposed at a suitable angle.

In operation, gypsum ground to a suitable degree of fineness, such as 60% passing through a U. S. Standard 100 mesh screen, is placed in the hopper 19 and heated vapor supplied to the jacket 11, or to the inner cylinder 21, or both. Rotation of the feeder 18 discharges ground gypsum at a substantially constant rate through the neck 16 and hood 14 into the space defined by the inner cylinder 21 and the outer cylinder 10. Rotation of the cylinder 21 and the vanes 23 insures thorough agitation of the material passing through the system and also determines the time of exposure.

Ordinarily, the outer cylinder 10 is suitably supported in fixed position and the inner cylinder 21 rotated as described. If desired, however, the inner cylinder 21 may be held stationary and the outer cylinder 10 rotated, or both the inner and outer cylinders rotated at different speeds, it being necessary only that there be relative rotative movement between the cylinders.

The temperature to which the heating surfaces are raised is dependent upon the physical characteristics of the saturated vapors employed and the pressure existing within the jacket 11 or the cylinder 21. Ordinarily, the temperature should range between 300° F. and 600° F. but should be controlled within ±5° F. and be maintained from day to day in order to obtain the desired uniformity of product. I prefer to employ vapors consisting primarily of ortho-dichlorobenzene having a boiling point of 352° F. at atmospheric pressure. These vapors condense uniformly upon the inner surface of the cylinder 10, thus evenly heating the surface. The temperature may be increased to approximately 405° F. by increasing the pressure in the jacket to approximately 15 pounds gauge. For higher temperatures vapors consisting primarily of a mixture of diphenyl and diphenyl oxide may be employed, preferably in the form of a eutectic mixture having a boiling point of 495.8° F. at atmospheric pressure. The system is operated in such manner as to insure the generation and use of saturated rather than superheated vapor, and control obtained by regulation of the absolute pressure in the condensing space.

Figure 4:
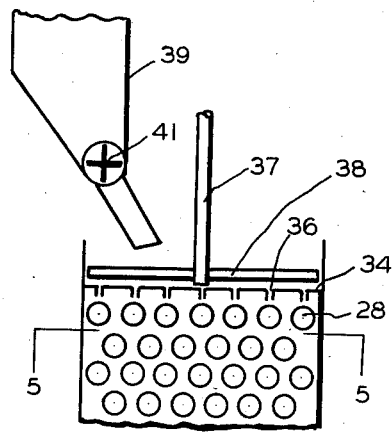
Fig. 4 is a partial diagrammatic elevation of a modified form of gypsum calcining apparatus incorporating my invention, taken along the line 4—4 of Fig. 5.
Figure 4:
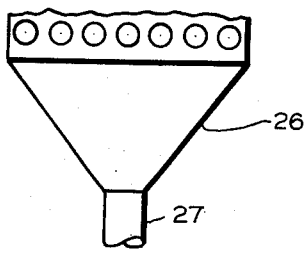
Figure 5:
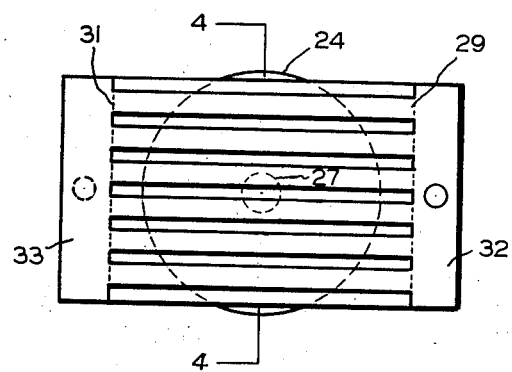
Fig. 5 is a cross section of the device illustrated in Fig. 4, taken along the line 5—5.

Another suitable form of gypsum calcining apparatus is illustrated in Figs. 4 and 5 and includes an upright cylindrical body 24 having an open top and an inverted conical bottom 26 communicating with a discharge 27. A plurality of tubes 28 extend transversely through the body 24 in rows, the tubes of one row being staggered in position with respect to the tubes in the row immediately above. The diameter of the tubes should exceed the distance between the external walls of the tubes, thus insuring that powdered gypsum falling downwardly through the tubes will be brought into successive contact with the heated tube surfaces. The tubes 28 terminate in tube sheets 29 and 31 covered by chests 32 and 33.

A plate 34 is fastened within the body 24 above the upper row of tubes 28 and defines a plurality of elongated slots 36 disposed immediately above the tubes in the upper tube row. An agitator 37 having a transverse blade 38 in the upper portion of the body 24 immediately above the plate 34 is employed to distribute ground gypsum uniformly across the plate 34, the material being fed to the device from hopper 39 through a conventional rotary feeder 41, as indicated in Fig. 4. The agitator 37 spreads the gypsum evenly across the plate 34, the material falling through slots 36 and cascading over the tubes 28 to the discharge 27. Vapors of the type previously described are introduced into the chest 32 and condense on the walls of the tubes 28, the latter being slightly inclined to drain condensate into the chest 33.

Figure 6:
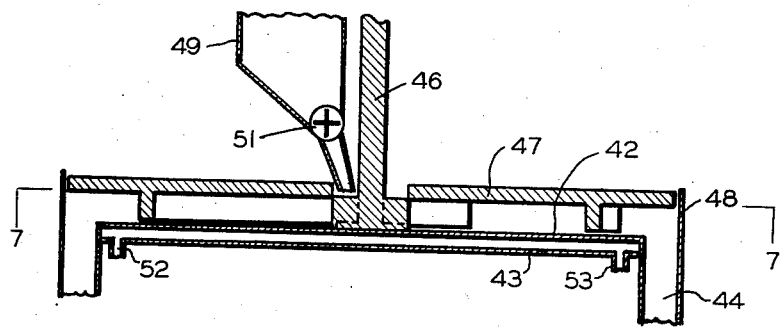
Fig. 6 is a diagrammatic elevation of a modified form of apparatus for calcining gypsum, taken along the line 6—6 of Fig. 7.
Figure 7:
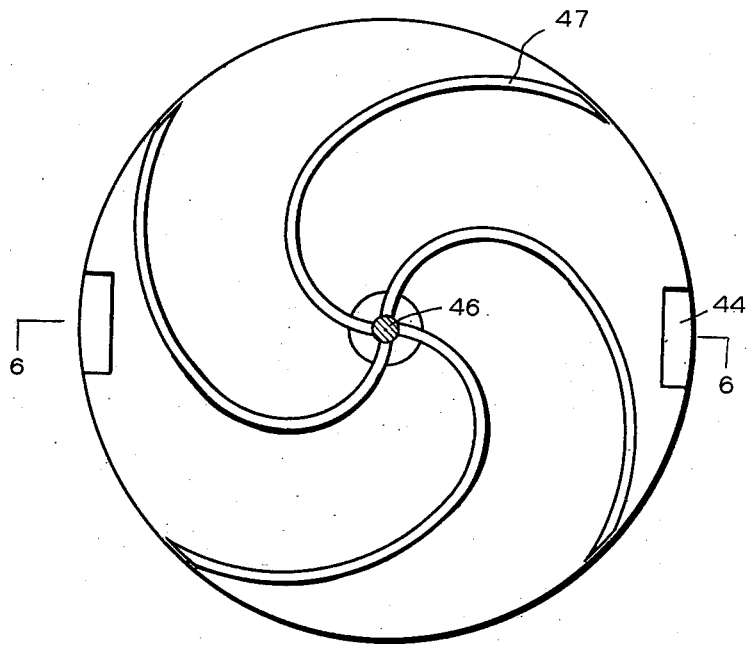
Fig. 7 is a partial plan view of the device illustrated in Fig. 6.

Another form of gypsum calcining apparatus is illustrated in Figs. 6 and 7 and includes a generally horizontal plate 42 having a jacket 43 along its lower face. The plate 42 is generally circular and defines diametrically opposed outlets 44 near its periphery. A vertical shaft 46 carries a plurality of spiral blades 47 extending radially outwardly from the shaft 46 and supported a short distance above the upper surface of the plate 42. The curvature of the blades 47 is such that if the shaft 46 is rotated in a counterclockwise direction, as viewed in Fig. 7, granular material on the surface of the plate 42 is swept outwardly towards the plate periphery. A rim 48 extends around the plate 42 thereby insuring that all of the material will be discharged through the outlets 44. Ground gypsum is deposited near the junction of the shaft 46 and the blades 47 by a hopper 49 and rotary feeder 51. Upon rotation of the shaft 46, this material is moved slowly outwardly towards the outlets 44 at a uniform predetermined rate. The plate 42 is heated to the desired temperature by introducing vapors into the jacket 43 through a suitable inlet 52, the condensate being discharged through an outlet 53.

Figure 8:
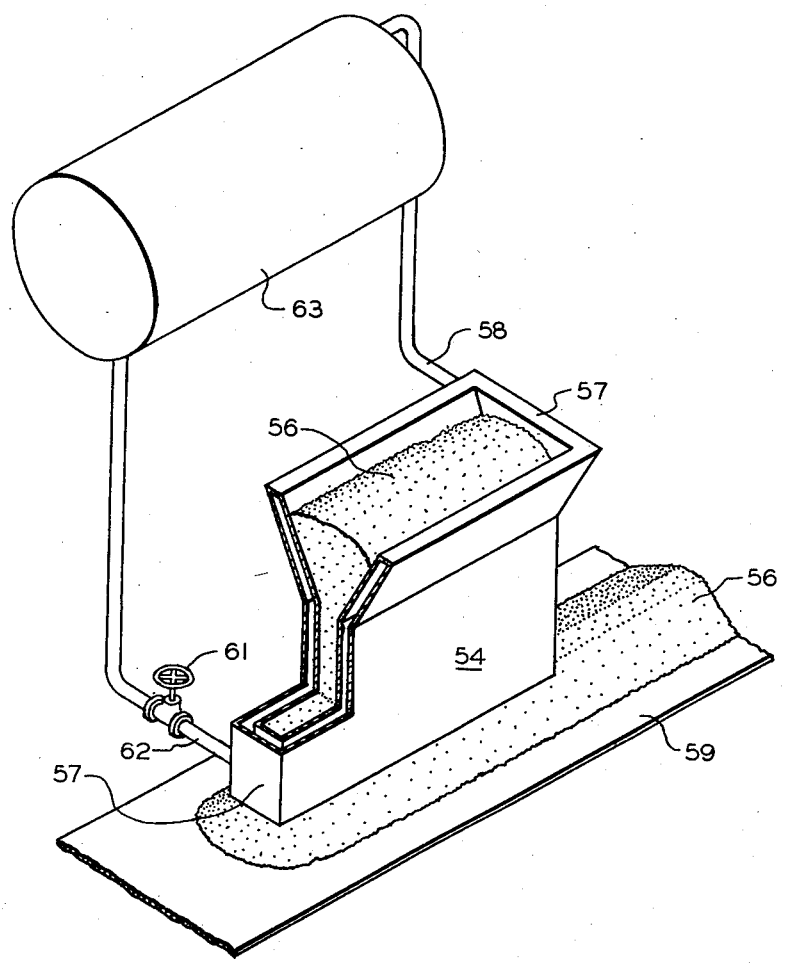
Fig. 8 is a perspective view of another form of gypsum calcining apparatus incorporated in my invention.

Another improved form of gypsum calcining apparatus is illustrated in Fig. 8 and includes a pair of upright parallel plates 54, the upper extremities of which flare outwardly to receive ground gypsum, indicated at 56. Upright end members 57 extend across the extremities of the plates 54, thus defining a chute having an open top and an open bottom. The plates 54 and the end members 57 are jacketed and communicate with each other in such manner that the entire chute can be heated by the introduction of vapor of the type described through a suitable inlet 58. A conveyor belt 59, or the like, is disposed immediately below the bottom extremities of the plates 54 and is adapted to move material discharged from the chute at a uniform rate which in turn determines the rate at which material will fall through the chute. A pressure regulating valve 61 may be connected with a suitable condensate outlet 62 and with a boiler 63, which supplies the vapor to the inlet 58.

The ground gypsum 56 is fed in any suitable manner into the chute or area between the plates 54 and the end members 57, which are heated to a predetermined temperature. The rate at which the material progresses past the plates 54 is controlled by the speed of the conveyor belt 59. Since the plates 54 are preferably placed in close proximity with each other, the distance which the heat is required to penetrate into the ground material is held to a minimum, thus permitting both rapid feeding of the ground material and thorough calcination.

It will be understood that in each of the devices described the components are preferably dimensioned and operated in such manner as to maintain a film of ground gypsum in contact with the heating or calcining surface of such thickness as to insure rapid heat transfer through the film. The best results will be obtained when the film thickness does not exceed approximately two inches. It will also be understood that the usual forms of saturated vapor generating and temperature controlling devices may be employed in each instance, the actual temperature obtained being controlled by regulation of the absolute pressure within the heating jackets. These pressures should not exceed fifteen pounds per square inch gauge.

It will be noted that in each device illustrated I have provided means for moving a relatively thin film or stream of ground gypsum at a controllable rate across a uniformly heated surface, thus permitting continuous operation and virtually insuring uniform calcination. Since highly accurate control of temperature is easily attained, the danger of burning or overheating individual particles is reduced to a minimum. The heat transfer coefficient realized by the use of the vapor described is exceptionally high and is frequently approximately 100 times as great as that which can be obtained by passing combustion gases across a similar surface. The characteristics of the liquid and vapor employed are such that the necessary temperatures are easily obtainable at approximately atmospheric pressure, thus obviating danger and expense usually associated with high temperature vapor heating devices.

Furthermore, it will be observed that considerably less agitation is required because the heated surface does not exceed a safe temperature at any point. It will also be found in practice that the rate at which material can be passed through devices incorporating my invention is substantially increased since the rate at which heat is transferred to the individual particles is not drastically limited by the necessity of forcing the heat through an appreciable thickness of powdered material.

The foregoing detailed description should be understood as illustrating various preferred embodiments of my invention but is not intended by way of limitation, since obviously other forms of apparatus may be employed. I therefore do not limit myself to these specific embodiments, except insofar as defined in the appended claims.

I claim:

1. The process of calcining gypsum which comprises continually moving ground gypsum in the form of a thin layer at a constant rate of speed through a path defined by surfaces including a hot surface and a moving surface while maintaining the hot surface at a predetermined heat by conduction from substantially saturated vapor at approximately atmospheric pressure of a condensable liquid having a boiling point in excess of 300° F. and at the same time regulating the speed of the moving surface to determine the rate of flow of said gypsum over the hot surface.

2. The process claimed in claim 1, in which the boiling point of the condensable liquid is between 300° F. and 600° F.

3. The process claimed in claim 1, in which the surfaces defining the path comprise a pair of spaced parallel vertical hot surfaces between which the layer of ground gypsum moves by gravity.

4. The process claimed in claim 1, in which the surfaces defining the path comprise a pair of spaced parallel vertical hot surfaces between which the layer of ground gypsum moves by gravity and which includes the step of moving the moving surface horizontally beneath the hot surfaces to remove gypsum issuing from between the hot surfaces.

References Cited in the file of this patent

UNITED STATES PATENTS

| Number | Name | Date |
|---|---|---|
| Re. 9,711 | Hana | May 17, 1881 |
| 321,636 | Penniman | July 7, 1885 |
| 685,336 | Leroy et al. | Oct. 29, 1901 |
| 948,330 | Jackson et al. | Feb. 8, 1910 |
| 1,673,464 | McLaughlin | June 12, 1928 |
| 1,734,824 | Offenhauser | Nov. 5, 1929 |
| 1,763,538 | Randolph | June 10, 1930 |
| 1,967,029 | Karrick et al. | July 17, 1934 |
| 2,000,886 | Dow | May 7, 1935 |
| 2,021,012 | McCullough | Nov. 12, 1935 |
| 2,118,421 | Steinmann | May 24, 1938 |
| 2,360,408 | Dunn et al. | Oct. 17, 1944 |
| 2,471,538 | Oaks | May 31, 1949 |
| 2,478,889 | Harris | Aug. 16, 1949 |
| 2,479,576 | Karrick | Aug. 23, 1949 |
| 2,515,672 | Sowa | July 18, 1950 |
| 2,536,099 | Schleicher | Jan. 2, 1951 |
| 2,546,251 | Baker | Mar. 27, 1951 |

FOREIGN PATENTS

| Number | Country | Date |
|---|---|---|
| 34,929 | Switzerland | Sept. 26, 1905 |
| 174,895 | Germany | Sept. 10, 1904 |

OTHER REFERENCES

"Process Heat Transfer," by D. Q. Kern, pages 512 and 513, published by McGraw-Hill Book Co., Inc. 1950.